United States Patent
Zitlaw

(10) Patent No.: US 8,291,126 B2
(45) Date of Patent: Oct. 16, 2012

(54) VARIABLE READ LATENCY ON A SERIAL MEMORY BUS

(75) Inventor: Clifford Alan Zitlaw, Chico, CA (US)

(73) Assignee: Spansion LLC, Sunnyvale, CA (US)

( * ) Notice: Subject to any disclaimer, the term of this patent is extended or adjusted under 35 U.S.C. 154(b) by 42 days.

(21) Appl. No.: 12/729,905

(22) Filed: Mar. 23, 2010

(65) Prior Publication Data

US 2011/0238866 A1   Sep. 29, 2011

(51) Int. Cl.
*G06F 3/00*   (2006.01)
*G06F 13/00*   (2006.01)

(52) U.S. Cl. .......... 710/5; 710/6; 710/8; 710/15; 710/33

(58) Field of Classification Search .................. None
See application file for complete search history.

(56) References Cited

U.S. PATENT DOCUMENTS

2005/0068812 A1*   3/2005   Oh ............................. 365/193
2006/0026375 A1*   2/2006   Christenson et al. ........ 711/167

OTHER PUBLICATIONS

128 MB Burst CellularRAM 1.5 memory, 2005, The CellularRAM Workgroup, [online, accessed on Jul. 18, 2011], URL: http://download.micron.com/pdf/datasheets/psram/wkgp_128mb_burst_cr1_5.pdf.*

* cited by examiner

*Primary Examiner* — Scott Sun
(74) *Attorney, Agent, or Firm* — Frommer, Lawrence & Haug LLP; Matthew M. Gaffney

(57) ABSTRACT

One or more embodiments provide a method and system of reading data from a variable-latency memory, via a serial input/output memory data interface. The system includes a memory having a variable-latency access time, a memory controller, and a serial data bus coupling the memory controller to the memory. The memory controller communicates a Read command to the memory and forces the serial data bus low for a limited time. The memory then forces the bus low and the memory controller then releases the bus. When the memory is ready to provide data, the memory provides a high signal on the serial data bus.

12 Claims, 4 Drawing Sheets

VARIABLE READ LATENCY ON A SERIAL MEMORY BUS

FIELD

The present invention relates generally to integrated circuits. In particular, embodiments of the present invention relate to variable latency serial memory devices.

BACKGROUND OF THE INVENTION

Memory devices are typically provided as internal, semiconductor, integrated circuits in computers or other electronic devices. There are many different types of memory including random access memory (RAM), read only memory (ROM), dynamic random access memory (DRAM), synchronous dynamic random access memory (SDRAM), and flash memory.

A synchronous DRAM (SDRAM) is a type of DRAM that can run at much higher clock speeds than conventional DRAM memory. SDRAM synchronizes itself with a CPU's bus and is capable of running at 100 MHZ or 133 MHZ, about three times faster than conventional FPM (Fast Page Mode) RAM, and about twice as fast EDO (Extended Data Output) DRAM and BEDO (Burst Extended Data Output) DRAM. An extended form of SDRAM that can transfer a data value on the rising and falling edge of the clock signal is called double data rate SDRAM (DDR SDRAM, or simply, DDR).

Computers almost always contain a small amount of read-only memory (ROM) that holds instructions for starting up the computer. Unlike RAM, ROM cannot be written to. An EEPROM (electrically erasable programmable read-only memory) is a special type non-volatile ROM that can be erased by exposing it to an electrical charge. Like other types of ROM, EEPROM is traditionally not as fast as RAM. EEPROM comprise a large number of memory cells having electrically isolated gates (floating gates). Data is stored in the memory cells in the form of charge on the floating gates. Charge is transported to or removed from the floating gates by programming and erase operations, respectively.

Yet another type of non-volatile memory is a Flash memory. A Flash memory is a type of EEPROM that can be erased and reprogrammed in blocks instead of one byte at a time. Many modern PCs have their BIOS stored on a Flash memory chip so that it can easily be updated if necessary. Such a BIOS is sometimes called a Flash BIOS.

A typical Flash memory comprises a memory array, which includes a large number of memory cells. Each of the memory cells may include a field-effect transistor capable of holding a charge, for instance by use of a floating gate or a structure capable of trapping a charge. The cells are usually grouped into blocks. Each of the cells within a block can be electrically programmed in a random basis by charging the floating gate. The charge can be removed from the floating gate by a block erase operation. The data in a cell is determined by the presence or absence of the charge in the floating gate.

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

Two common types of flash memory array architectures are the "NAND" and "NOR" architectures, so called for the logical form in which the basic memory cell configuration or each is arranged. In the NOR array architecture, the floating gate memory cells of the memory array are arranged in a matrix. The gates of each floating gate memory cell of the array matrix are coupled by rows to word select lines and their drains are coupled to column bit lines. The NOR architecture floating gate memory array is accessed by a row decoder activating a row of floating gate memory cells by selecting the word select line coupled to their gates. The row of selected memory cells then place their data values on the column bit lines by flowing different currents depending on if a particular cell is in a programmed state or an erased state.

NAND is suited for high capacity data storage, while NOR is suited for code storage and execution, usually in small capacities. NOR offers eXecute In Place (XIP) capabilities and high read performance, but suffers from extremely low write and erase performance. NOR is typically used for code storage and execution, mainly in capacities up to 4 MB common in applications such as simple consumer appliances, low-end cell phones and embedded applications. NOR typically is available in capacities of generally 1 MB-2 GB, and more cost effective in the lower capacities.

On the other hand, NAND architecture offers extremely high cell densities and high capacity, combined with fast write rate and erase rate. NAND is mostly used for data storage in memory cards (e.g., CF, SD, MMC, PCMCIA). NAND-based devices may include a separate NOR memory to store code for execution.

A NAND array architecture also arranges its array of floating gate memory cells in a matrix such that the gates of each floating gate memory cell of the array are coupled by rows to word select lines. However each memory cell is not directly coupled to a column bit line by its drain. Instead, the memory cells of the array are coupled together in series, source to drain, between a source line and a column bit line. The NAND architecture floating gate memory array is then accessed by a row decoder activating a row of floating gate memory cells by selecting the word select line coupled to their gates. In addition, the word lines coupled to the gates of the unselected memory cells of each group are driven to operate the unselected memory cells of each group as pass transistors, so that they pass current in a manner that is unrestricted by their stored data values. Current then flows from the source line to the column bit line through each series coupled group, restricted only by the selected memory cells of each group. This places the current encoded data values of the row of selected memory cells on the column bit lines.

At high densities, the cost of NAND memories is significantly less than NOR devices of comparable density. This cost differential makes NAND devices increasingly attractive for embedded applications in which NOR devices are typically used. At lower densities (e.g., under 128 MB), NOR is still attractive from a cost perspective.

As memory manufacturers continue to innovate and create, a serial interface is increasingly attractive as offering several benefits over the parallel interface in reducing overall systems costs including microcontroller and chipset pin-count reduction, smaller and simpler printed circuit boards, and lower power consumption.

Serial flash memory is an attractive solution for a variety of applications. Serial memories are popular because of their efficient signal interface and cost effective packages. The serial interface offers several benefits over the parallel interface in reducing overall systems costs including microcontroller and chipset pin-count reduction, smaller and simpler printed circuit boards, and lower power consumption.

A serial interface using the Serial Peripheral Interface (SPI) bus has gained significant industry acceptance for its low pin count (as low as 4 active signals) and high clock rates (running in excess of 100 MHz). The SPI bus is often used in designs where low cost is important.

An SPI system includes one master device and one or more slave devices that communicate using the SPI bus. The master is a microcomputer providing the SPI clock, and the slave is an integrated circuit that receives the SPI clock from the master. The slave may include one or more SPI memory devices, which allow for smaller die sizes and smaller packages, and lowered pin count, compared to non-SPI-based memory devices.

Some types of memory technology have a variable period of time between receipt of an address from which to read the memory, and the contents of that memory address being available for transfer from the memory device. For instance, PSRAM devices have longer initial accesses when an internal refresh operation must complete before the read request can be processed. A fixed latency period, if used, would have to be set long enough to accommodate the longest access time of the memory under all circumstances. Any time between the actual access time and the longest access time would be inefficiently used as idle time.

A variable latency can be implemented for the memory device to signal when the memory contents are available to be read from the device. For instance, some PSRAM devices utilize a dedicated signal line to indicate when the PSRAM device is ready to provide the memory contents, to differentiate between slower and longer initial read accesses. In this was a variable latency is provided. However, the dedicated signal line increases the size, pin count, and interconnect cost of the memory device.

For the reasons stated above, and for other reasons stated below which will become apparent to those skilled in the art upon reading and understanding the present specification, there is a need in the art for a variable read latency on a serial memory bus, such that a dedicated signal line is not used.

SUMMARY OF THE INVENTION

One or more embodiments of the invention includes a method of reading data from a variable-latency memory, via a serial input/output memory data interface, such that the read latency is dependent upon the memory latency. The method including the steps of communicating a command, from a memory controller to a variable-latency memory, to read a portion of the variable-latency memory; forcing a data line of the serial input/output memory data interface to a first logic state, for a predetermined period of time; detecting, after completion of the predetermined period of time, a limited duration signal on a data line of the serial input/output memory data interface, the limited duration signal detected at a second logic state; and reading data, provided by the variable-latency memory, on the serial input/output memory data interface after an end of the limited duration signal.

One or more embodiments of the invention includes a method of providing data from a variable-latency memory, via a serial input/output memory data interface, such that the read latency is variable and dependent upon the memory latency. The method including the steps of receiving a command from a memory controller, by the variable-latency memory, to provide a portion of the variable-latency memory; forcing a data line of the serial input/output memory data interface to a first logic state; providing, after completion of a variable latency of the variable-latency memory, a limited duration signal on a data line of the serial input/output memory data interface, the limited duration signal provided at a second logic state; and providing data on the serial input/output memory data interface after an end of the limited duration signal.

One or more embodiments of the invention includes a system of reading data from a variable-latency memory, via a serial input/output memory data interface, such that the read latency is dependent upon the memory latency, the system including a memory having a variable-latency access time; a serial input/output memory data interface coupled at a first end to the variable-latency memory; and a memory controller coupled to a second end of the serial input/output memory data interface. The system performs a method of reading data from a variable-latency memory, via a serial input/output memory data interface, in accordance with one or more embodiments of the invention. The system further performs a method of providing data from a variable-latency memory, via a serial input/output memory data interface, in accordance with one or more embodiments of the invention.

One or more embodiments of the invention includes software stored in a storage medium, the software encoded so as to control a processor, such that a processor so encoded is able to efficiently read data from a variable-latency memory, via a serial input/output memory data interface, such that the read latency is dependent upon the memory latency. The processor is transformed to a different state by reading the data from the variable-latency memory.

DESCRIPTION OF THE DRAWINGS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

DETAILED DESCRIPTION

Variable latency has been successfully incorporated into the parallel burst NOR memory bus by adding a dedicated WAIT signal interface. During READ operations, the dedicated WAIT signal interface is asserted until data is ready to be output onto the data bus. Once data is available, the dedicated WAIT signal interface is deasserted and data is transferred from the memory to the host. Variable latency has had its greatest impact when incorporated on NOR-bus-based burst Pseudo Static Random Access Memory (PSRAM)

devices, for which a longer latency is required for a read operation while the PSRAM device is performing an internal refresh. For these PSRAM devices, most read operations occur with a short latency during normal read operations, but the read access latency is extended when a read access collides with an ongoing internal refresh. A dedicated WAIT signal is used by many PSRAM devices to facilitate the variable latency functionality.

Reading a memory device using a variable latency reading method would be an attractive performance enhancement to the SPI protocol as long as performance is enhanced and pin-count is not increased. One or more embodiments of the present invention add variable latency reading functionality to the existing SPI protocol without usage of additional dedicated signal lines. The embodiments of the invention described herein encompass method (including software), device, and system to implement the variable latency memory access.

Figure 1:
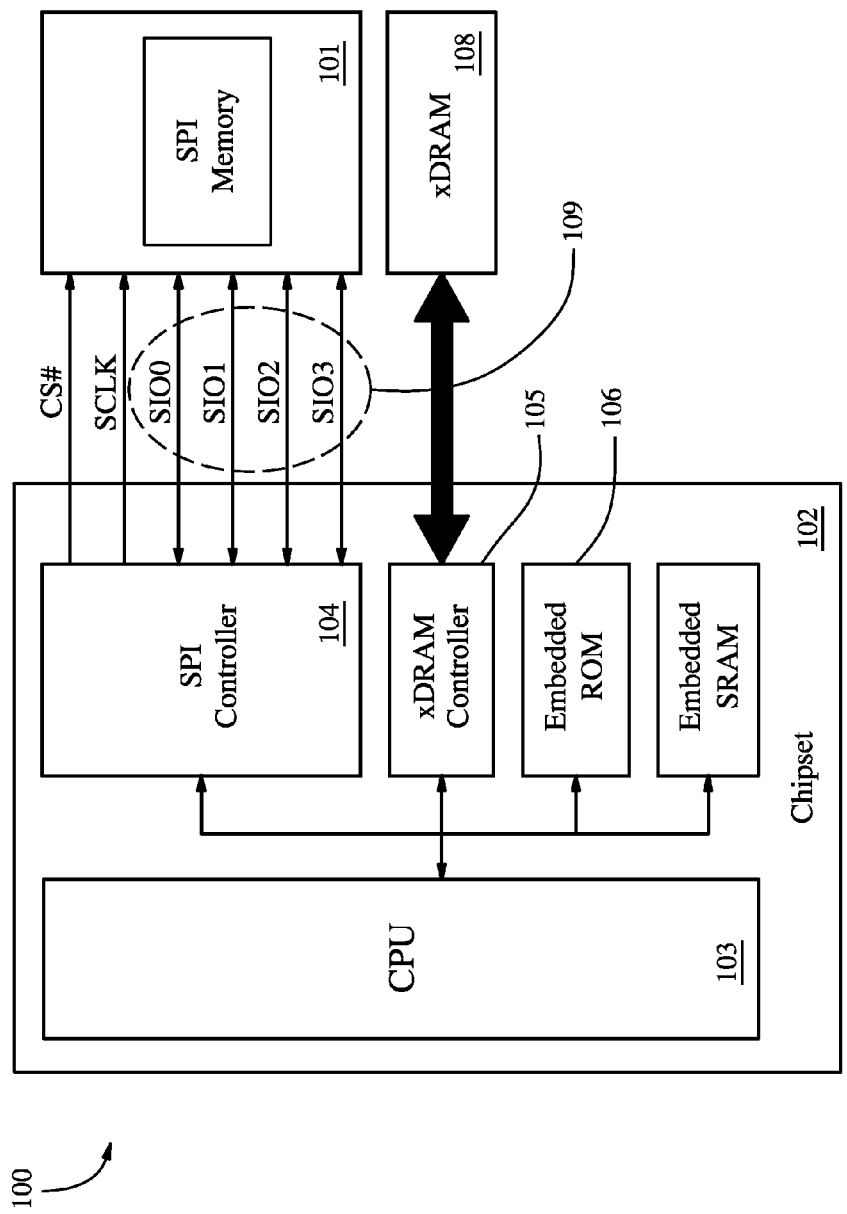
FIG. 1 shows a typical embedded system incorporating the four bit (six active signals) version of the SPI bus according to the known art.

FIG. 1 illustrates an exemplary system 100 using SPI memory 101, as known in the art. The system 100 includes a processor chipset 102 interfacing with SPI memory 101 and may include one or more other types of conventional ROM and/or xDRAM memory (e.g., SDRAM, etc). The processor chipset 102 includes a CPU 103, controllers 104, 105 interfacing with the SPI memory 101 and xDRAM memory 108, and embedded memory (ROM 106 and/or RAM 107). The physical interface to/from the SPI memory 101 includes a chip select (CS) line, serial clock (SCLK), and bidirectional serial input/output (SIO) lines(s) 109, also referred herein as a SIO bus 109. A plurality of SIO lines 109 may be provided to transfer multiple bits in parallel. For instance, FIG. 1 illustrates SIO0-SIO3, capable of transferring 4 bits (half a byte) in parallel. The individual lines may be referred herein as SIO[0] through SIO[3], or collectively as SIO[3:0] or SIO[0:3]. The remainder of the interfaces necessary to operate system 100 are well known to persons of skill in the art, and will not be described herein further.

Figure 2:
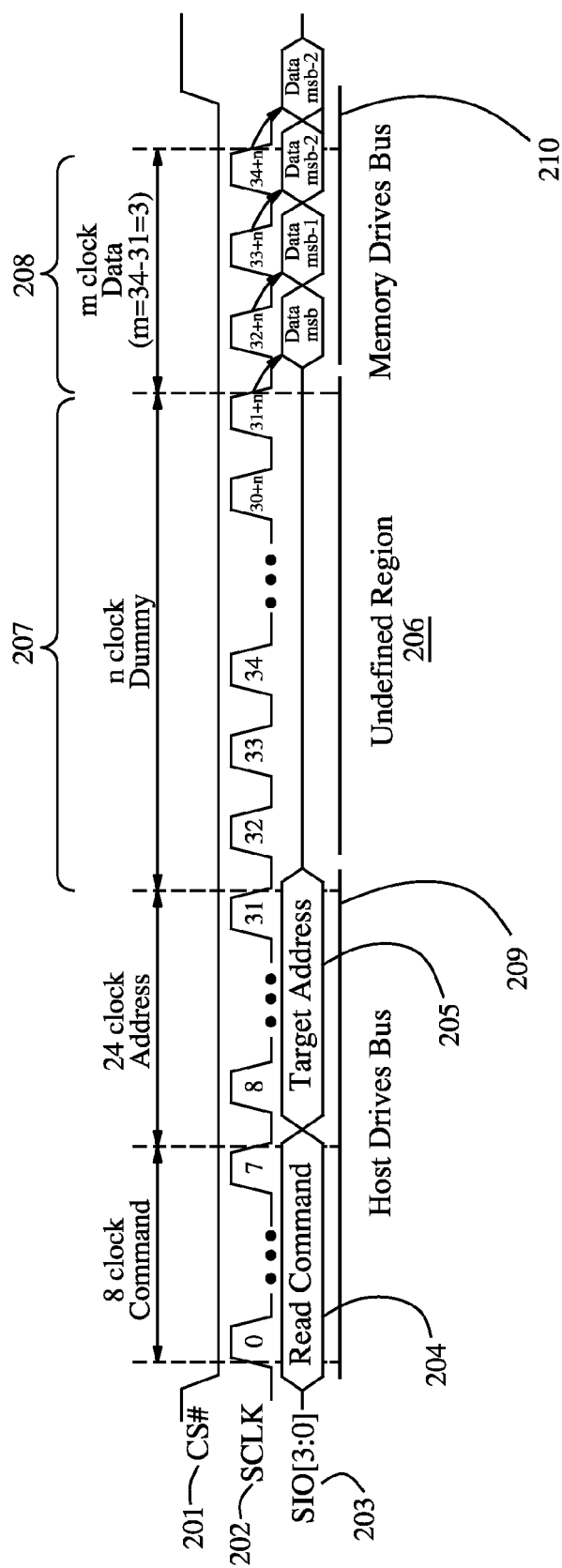
FIG. 2 shows an SPI Read Operation according to the known art.

FIG. 2 illustrates the timing associated with a legacy SPI memory read process according to the known art, showing unused dummy cycles during a fixed length wait period 207. During time period 209, the host (e.g., an SPI memory controller not shown in FIG. 2) is in control of SIO bus 203. The legacy SPI protocol performs a read operation by, first, having the host drive a chip select 201 to a "LOW" logic state to start the operation. Second, the host issues a Read command 204 on the SIO bus 203, issues a target memory address 205 on the SIO bus 203, and allows the SIO bus 203 to float to a tristate logic state during time period 206, tristate being an undefined logic state in which the tristated line is electrically floating between HIGH and LOW logic states, without being tied to either state. Next, during a wait period 207, the read process must wait a predetermined number of clock periods of serial clock 202 (e.g., "n" clock periods), to accommodate the read latency of the SPI memory. Upon the end of the wait period 207, the SPI memory device is in control of SIO bus 203 during time period 210. The SPI memory device serially returns data from memory during time period 208, using SIO lines 203, starting at the target memory address. Once the target data is retrieved, the host drives the chip select 201 to a "HIGH" logic state to terminate the read operation.

As can be seen from FIG. 2, the SIO bus 203 is substantially idle during the wait period 207 after the host specifies the target address 205 and before the time 208 that the memory starts providing the requested data from the SPI memory. The only significant event that occurs during this wait period 207 is that the host stops driving the serial I/O bus 203 during time period 206 so that there is no contention when the SPI memory device takes over and starts driving data onto the serial I/O bus 203 during time period 210. This wait period 207 is a fixed latency period that must be long enough to accommodate the longest latency of the SPI memory device.

Figure 3:
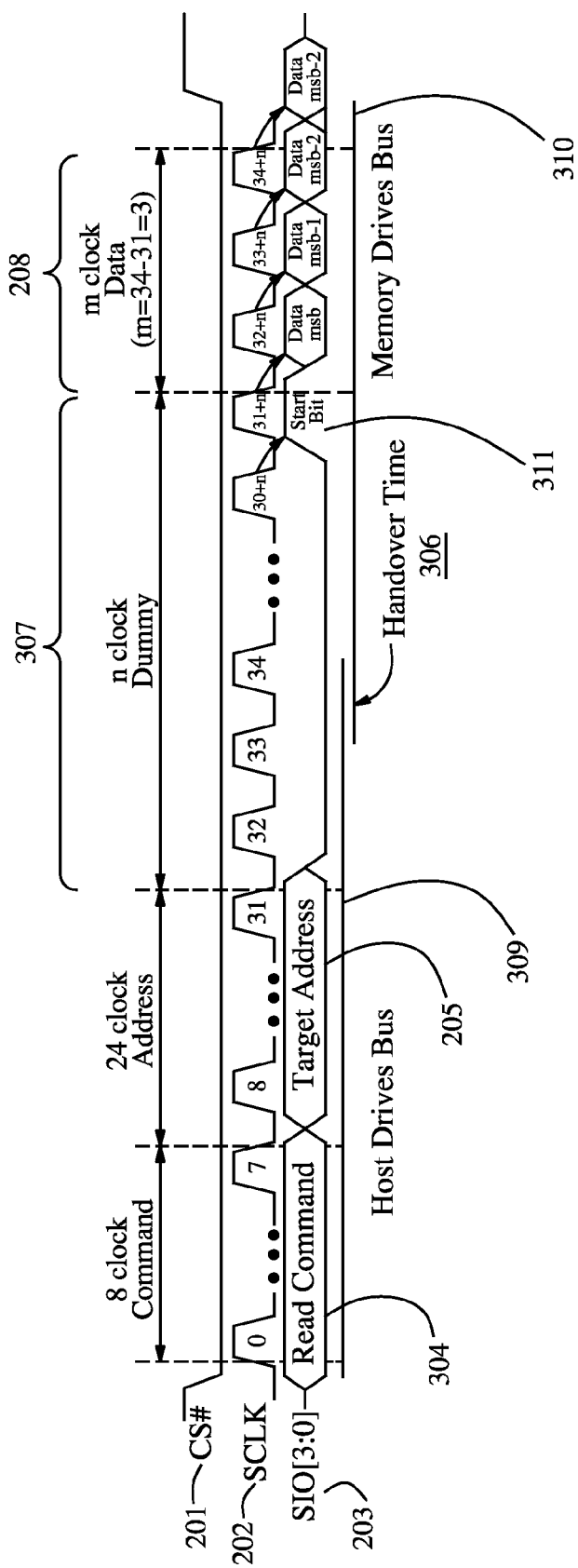
FIG. 3 shows an SPI Read Operation using a Start bit, in accord with an embodiment of the invention.

FIG. 3 illustrates the timing associated with an improved SPI read operation, in accord with an embodiment of the invention. The improved SPI read operation provides increased efficiency such that the SPI read operation has a variable latency that depends upon the variable latency of the memory. The embodiment of FIG. 3 has modified the SPI protocol to include a predetermined marker or training pattern on the SIO bus 203 to signal to the memory controller that the SPI memory device is ready to begin providing on the SIO bus 203 the requested memory data. In the embodiment of FIG. 3, the marker is depicted as a Start bit 311 on the SIO bus 203. Other modifications to the legacy SPI method will become apparent in the description that follows.

As shown in FIG. 3, a host (not shown in FIG. 3) interfaces to/from a corresponding SPI memory device (not shown in FIG. 3) by use of chip select interface 201, serial clock interface 202 and bidirectional SIO bus 203. Serial clock interface 202 is used to clock the data transferred in either direction on the SIO bus 203.

A memory access sequence begins when the host drives the chip select 201 to a low logic state to select the corresponding SPI memory device. During time period 309 when the host drives the SIO bus 203, the host first provides Read command 304 on the SIO bus 203. Optionally, Read command 304 may differ from Read command 204 such that the SPI memory device will be able to interpret Read command 304 as requesting a memory access according to the variable latency protocol of the present invention, in contrast to Read command 204 which would request a memory access according to a fixed latency protocol. In this way, the SPI memory device can be compatible with either fixed or variable latency reading designs.

After the host provides Read command 304, the host provides target address 205 on the SIO bus 203 to indicate what memory contents should be returned from the SPI memory. After the target address 205 is provided, a wait period 307 begins, during which the SPI memory device processes Read command 304 and target address 205. Wait period 307 is illustrated in FIG. 3 as being "n" cycles of serial clock 202, however wait period 307 generally is not the same number of clock cycles as wait period 207. The length of wait period 307 is determined by the variable latency reading method described herein, and therefore the length of wait period 307 may vary from one memory access to another memory access.

After recognition of the completion of the target address 205, the SPI memory will drive the SIO bus 203 to a low logic state. In the embodiment of FIG. 3, this occurs about one cycle of serial clock 202 after the completion of the target address 205. Additionally, for several cycles of serial clock 202 after the completion of the target address 205 (i.e., at the start of wait period 307), the host continues to hold the SIO bus 203 in a low logic state. For instance, in the embodiment of FIG. 3, the host holds the SIO bus 203 in a low logic state for about 2-3 cycles of serial clock 202. The time that the host continues to hold the SIO bus 203 low is at least as long as the time needed for the SPI memory to begin driving the SIO bus 203 low, yet shorter that the shortest possible wait period 307.

Together, by the SPI memory device driving the SIO bus 203 low during wait period 307, and the host continuing to hold the SIO bus 203 low during the beginning of wait period 307, as described above, there is ensured a handover time 306 during which both the host and the SPI memory device are driving SIO bus 203 to a low logic state. Even though both the host and SPI memory device are driving the bus simultaneously, there will be no contention problem because they are both driving the bus to the low logic state. Therefore, the SIO bus 203 is affirmatively held in a low logic state while the SPI memory device is processing the Read command 304 and target address 205. Having the SIO bus held low continuously during this processing time acts to substantially reduce the likelihood that an electrical noise, disturbance, or undriven state of the SIO bus 203 would be misinterpreted as a Start bit 311 that is further described below.

When the SPI memory device is ready to provide the contents of the requested memory address, the SPI memory device signals the host by asserting a starting signal such as Start bit 311 on the SIO bus 203. Optionally, the starting signal can be driven and sensed on a single data line of SIO bus 203, or on multiple data lines of SIO bus 203, or may be provided as a pattern of bits on one or more of the data lines. The SPI memory device then begins to send the memory contents during time period 208. Although FIG. 3 illustrates time period 208 beginning immediately after Start bit 311, there may be a further delay of one or more clock periods after Start bit 311 before the time period 208 begins. The memory contents requested by the host are returned to the host during time period 208.

The memory controller usable in the embodiment of FIG. 3 will include hardware, software and/or firmware that is modified from a similar legacy memory controller to support the variable latency reading method. For instance, the memory controller should be configured to support the generation of Read command 304. The memory controller should be configured to hold the SIO bus 203 to a logic low state during at least a portion of wait period 307. The memory controller should be configured to detect the Start bit 311 on SIO bus 203, such that the memory controller is then able to begin accepting the memory data during time period 208. The memory controller can be configured to support these functions by, for instance, the use of software stored in a software code storage medium, such that the software is operable to change the state of the memory controller and/or the SIO bus 203 such that these functions are supported.

Figure 4:
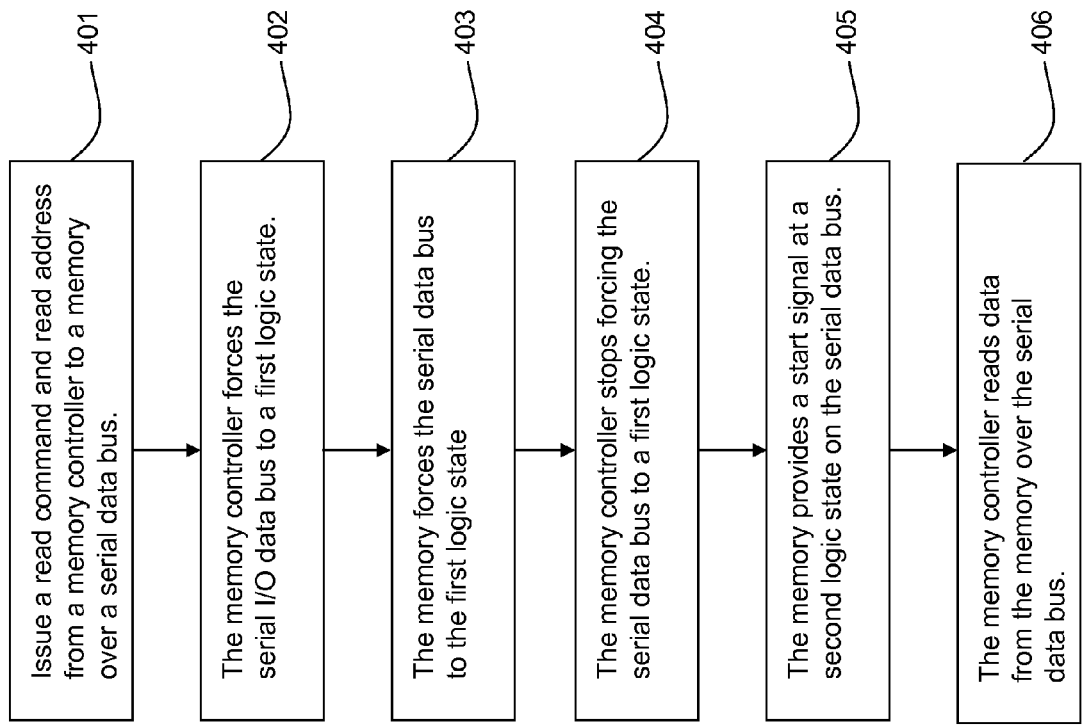
FIG. 4 shows a flow chart of a method to read in a variable-latency manner a memory having a variable latency.

FIG. 4 illustrates a flow chart of an embodiment of a variable latency method of reading a variable latency memory on a serial data bus, in accord with the invention. The method begins at step 401, during which the memory controller issues a Read command and a Read Address to the variable latency memory. The Read command may be configured to initiate a memory access according to a variable latency method, as discussed above in connection with FIG. 3. Next, at step 402, the memory controller forces one or more lines of the serial I/O bus to a first logic state. Typically, the first logic state is a low logic state. It should be understood that this may involve as few as one line of the serial I/O bus. For instance, referring to the embodiment of FIG. 3, data line SIO[0] may be forced to a first logic state without affecting the state of SIO[3:1].

Next, at step 403, the memory also forces the serial I/O bus to the first logic state. The completion of step 403 marks the beginning of a handover period when the serial I/O bus is being driven to the first logic state by both the memory controller and by the variable-latency memory.

Next, at step 404, the memory controller stops forcing the serial I/O bus to a first logic state. The completion of step 404 marks the end of the handover period. The serial I/O bus is still being driven to the first logic state by the variable-latency memory.

Next, at step 405, the variable-latency memory signals that the requested contents of the variable-latency memory are ready to be read. The signaling may be by way of forcing at least a portion of the serial I/O bus to a second logic state. The signaling may also be by way of providing a predetermined pattern on the serial I/O bus, either on a single line of the serial I/O bus (e.g., a multi-bit pattern), or of a predetermined relationship between lines (e.g., if only SIO[0:1] had been forced low while waiting during the memory latency, then also forcing SIO[2:3] low when the memory is ready to read).

Finally, at step 406, the memory controller reads the requested contents of the variable-latency memory over the serial I/O bus.

The embodiments of the invention described herein can be used to implement variable latency memory access to allow the SPI memory device to reduce the memory access time depending upon the internal state of the SPI memory device, e.g., depending upon the refresh state of the memory. The optimization tends to reduce average initial access times when compared to memories that have fixed initial latencies that must always allow for worst case latency scenarios. This variable latency signaling method can also be incorporated into other memory interfaces.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method of reading data from a variable-latency memory, via a serial input/output memory data interface, the method comprising the steps of:
communicating a command, from a memory controller to a variable-latency memory, to read a portion of the variable-latency memory;
forcing a data line of the serial input/output memory data interface to a first logic state, for a predetermined period of time;
detecting, after the predetermined period of time, a limited duration signal on a data line of the serial input/output memory data interface, the limited duration signal detected at a second logic state; and
reading data, provided by the variable-latency memory, on the serial input/output memory data interface after an end of the limited duration signal.

2. The method of claim 1, wherein the limited duration signal comprises a start bit.

3. The method of claim 1, wherein the limited duration signal comprises a predetermined pattern of bits.

4. The method of claim 1, further comprising waiting a predetermined period of time after the step of detecting the limited duration signal and the step of reading data on the serial input/output memory data interface.

5. The method of claim 1, wherein the command includes an address of the data to read from the variable-latency memory.

6. A method of providing data from a variable-latency memory, via a serial input/output memory data interface, the method comprising the steps of:
   receiving a command from a memory controller, by the variable-latency memory, to provide a portion of the variable-latency memory;
   forcing a data line of the serial input/output memory data interface to a first logic state;
   providing, after completion of a variable latency of the variable-latency memory, a limited duration signal on a data line of the serial input/output memory data interface, the limited duration signal provided at a second logic state; and
   providing data on the serial input/output memory data interface after an end of the limited duration signal.

7. The method of claim 6, wherein the limited duration signal comprises a start bit.

8. The method of claim 6, wherein the limited duration signal comprises a predetermined pattern of bits.

9. The method of claim 6, further comprising waiting a predetermined period of time after the step of providing the limited duration signal and the step of providing data on the serial input/output memory data interface.

10. The method of claim 6, wherein the command includes an address of the data to read from the variable-latency memory.

11. A system of reading data from a variable-latency memory, via a serial input/output memory data interface, the system comprising:
   a memory having a variable-latency access time;
   a serial input/output memory data interface coupled at a first end to the variable latency memory; and
   a memory controller coupled to a second end of the serial input/output memory data interface
   wherein:
      the memory Controller is configured to communicate a command to a variable latency memory to read a portion of the variable-latency memory;
      the memory controller is configured to force a data line of the serial input/output memory data interface to a first logic state, for a predetermined period of time;
      the variable-latency memory is configured to force the data line of the serial input/output memory data interface to a first logic state before the completion of the predetermined period of time;
      the variable-latency memory is configured to provide, after completion of the variable latency access time of the variable-latency memory, a limited duration signal on a data line of the serial input/output memory interface, the limited duration signal provided at a second logic state;
      the memory controller is configured to detect the limited duration signal; and
      the memory controller is configured to read data, provided by the variable-latency memory, on the serial input/output memory data interface after an end of the limited duration signal.

12. A machine to read data from a variable-latency memory, via a serial input/output memory data interface, comprising:
   a processor coupled to a memory,
   wherein the processor is programmed to read data from the variable-latency memory by:
      communicating a command, from the processor to a variable-latency memory, to read a portion of the variable-latency memory;
      forcing a data line of the serial input/output memory data interface to a first logic state, for a predetermined period of time;
      detecting, after the predetermined period of time, a limited duration signal on a data line of the serial input/output memory data interface, the limited duration signal detected at a second logic state; and
      reading data, provided by the variable-latency memory, on the serial input/output memory data interface after an end of the limited duration signal.

* * * * *